United States Patent [19]

Short

[11] Patent Number: 6,005,886
[45] Date of Patent: Dec. 21, 1999

[54] SYNCHRONIZATION-FREE SPREAD-SPECTRUM DEMODULATOR

[75] Inventor: Robert Short, Salt Lake City, Utah

[73] Assignees: Digital Radio Communications Corp., American Fork; Digital Scientific, Inc., Salt Lake City, both of Utah

[21] Appl. No.: 08/689,194

[22] Filed: Aug. 5, 1996

[51] Int. Cl.$^6$ .............................. H04L 27/30; H03D 1/00
[52] U.S. Cl. .......................... 375/206; 375/208; 375/207
[58] Field of Search ...................................... 375/354, 377, 375/200, 207, 300, 301, 320, 206, 208; 381/15; 455/102, 210; 329/306, 358

[56] References Cited

U.S. PATENT DOCUMENTS

| 4,449,230 | 5/1984 | Yokoya ........................................ 381/15 |
| 5,353,301 | 10/1994 | Mitzlaff ................................... 375/200 |
| 5,442,662 | 8/1995 | Fukasawa et al. . | |

*Primary Examiner*—Don N. Vo
*Assistant Examiner*—Albert Park
*Attorney, Agent, or Firm*—Thorpe, North & Western, L.L.P.

[57] ABSTRACT

A system for transmitting and receiving spread-spectrum communications without having to synchronize the incoming spread-spectrum code at a receiver with a copy of the spreading sequence. A spreading signal itself is modulated with an information signal. Consequently, the various demodulation techniques available to the receiver enable the transmission of unmodified analog as well as digital data. The receiver first removes the carrier wave component, and then the spreading signal from the information stream without costly and complex synchronization of the spreading signals.

21 Claims, 6 Drawing Sheets

SYNCHRONIZATION-FREE SPREAD-SPECTRUM DEMODULATOR

BACKGROUND OF THE INVENTION

1. Field of the Invention

This invention pertains to spread-spectrum communications, and more specifically to a method and apparatus for encoding information to be transmitted in a manner which eliminates having to synchronize the received signal using a clock-recovery circuit, consequently simplifying the implementation of spread-spectrum communications.

2. State of the art

The Federal Communications Commission opened the Industrial, Scientific and Medical (ISM) frequency bands for use by unlicensed spread-spectrum users. This action resulted in the creation of a large market in spread-spectrum communications. However, the greatest obstacle in using these frequency bands is the cost. Present technology transceivers tend to be expensive, which inhibits the use of spread-spectrum technology.

Spread-spectrum communication is an effective method of transmitting and receiving coded information which is more resistant to interference than an unencoded information stream itself. This resistance to interference is the result of the large bandwidth over which the information stream is spread, and the requirement that both the transmitter and the receiver have the same spreading code (a predetermined, fixed pattern) or signal used to spread the information over the larger bandwidth. It is essential to the operation of present spread-spectrum communication systems that the receiver be synchronized to the incoming spreading code embedded with the spread-spectrum signal. The spreading code typically contains no information itself, but rather is used to transform the information stream into a signal which is spread over a spectrum of frequencies after being modulated onto a carrier signal.

Traditional direct-sequence spread-spectrum communication is a method for transmitting digital information over a channel (transmission medium) such as air which may be subject to interfering signals. FIG. 1A is a block diagram of this traditional digital spread-spectrum transmission system 10. The information stream 12 is an input to a first combining circuit 14 which also receives as an input a radio carrier signal 16. The first circuit 14 combines the signals 14, 16 and creates a new carrier signal 18 which is transmitted to a second combining circuit 20. The new information modulated carrier signal 18 is further modulated with a spreading signal 22 in second circuit 20 which creates a new spread-spectrum signal 24 which is then transmitted by an antenna to a receiver.

The second circuit 20 creates a direct-sequence spread-spectrum signal 24 from the digital information stream 12 by superimposing a new digital sequence 22 (the spreading sequence), having a much higher clock rate, upon the information modulated carrier signal 18. The spreading sequence 22 typically consists of a fixed pattern of logic high and low values and is known to both the transmitter 10 and the receiver (not yet shown). In radio systems, the spreading signal 22 is superimposed upon the information modulated carrier signal 18 using standard digital modulation techniques in second circuit 20 as known to those skilled in the art, most commonly phase-shift keying.

Although the most common spread-spectrum transmission method is modulating information onto a carrier, and then multiplying the carrier with a wide-band spreading code as described above, it should not be surprising that the process can also be reversed. That is, it is also possible to modulate a digital information stream 12 with a spreading code 22, and then modulate the spread signal 26 onto a carrier 16 for transmission as a spread-spectrum signal 24. This method is shown in FIG. 1B Using either method, however, it is the demodulation process which is the most complex process, and consequently the most expensive.

Before illustrating the demodulation process, FIGS. 2A, 2B and 2C are provided to show illustrative waveforms found at various stages of the spread-spectrum transmitting system 10 using the method of FIG. 1B. Digital information in a data stream consists of a sequence of logic high and logic low values described for convenience by +1 and −1 values as shown in FIG. 2A. The digital information stream is represented by line 12 as it appears at the input of modulating circuit 14.

FIG. 2B shows a representative spreading signal 16. As indicated, the frequency of the spreading signal 16 is much higher relative to the information stream 12. The resulting spread signal 18 is shown in FIG. 2C. After being superimposed upon the carrier signal 20, the spread-spectrum information carrier signal 24 (not shown) is transmitted by an antenna.

Thus far, the background has only addressed generating a digital spread-spectrum signal 24, a relatively straightforward process. In contrast, the process for receiving and demodulating the spread-spectrum signal 24 by a receiver 30 is relatively complex. The process is illustrated as a block diagram in FIG. 3. It should be remembered, however, that the spread-spectrum demodulator of FIG. 3 works with either modulating process as shown in FIGS. 1A or 1B.

FIG. 3 shows that the first step of the demodulation process is to recover the carrier by eliminating it from the received signal 28 using a carrier recovery circuit 32. This process is accomplished, for example, by execution of a coherent radio down-conversion. This is a process in which the frequency and the phase of the radio carrier (16, FIG. 1B) are estimated and then removed from the received signal 28. This down-conversion is usually implemented, for example, using a phase-locked loop or equivalent circuit 32. The signal now consists of the spread signal 18 as it existed prior to being superimposed upon a carrier 16.

The second step consists of removing the spreading signal 22 (or code) from the recovered spread signal 18 to obtain the original information stream 12. This is accomplished in a clock recovery circuit 36 by multiplying the RF demodulated signal by an exact replica of the spreading code 22. Unavoidably, the receiver 30 must have stored in a memory the same spreading code 22 being used by the transmitter 10.

One distinct drawback of the state of the art is that the clock recovery circuit 36 requires that the spreading signal replica 34 must first be aligned with the received signal 28 before extracting the information stream 12. This alignment or synchronization process is typically accomplished in the clock-recovery circuit 36. After synchronization and demodulation, the end result is the recovery of the original information stream 12. Synchronization and the use of a clock recovery circuit 36 is very undesirable because the circuitry 36 is complex, power consuming, and increases the overall cost of a receiver 30.

It should be observed that in this traditional spread-spectrum system, almost all of the receiver circuitry is found in the RF demodulating (carrier recovery circuit 32) and spreading code clock recovery circuit 36.

It would therefore be an advantage over the state of the art to provide a spread-spectrum communication system which is synchronization free. In other words, it would be an advantage to eliminate the need to align a received signal with a replica of the spreading code stored in the receiver, and thereby eliminate the receiver's clock synchronization circuitry.

A further advantage would be the implementation of a spread-spectrum system which could directly transmit analog information, instead of having to first digitize the analog information stream.

OBJECTS AND SUMMARY OF THE INVENTION

It is an object of the present invention to provide a method and apparatus for achieving synchronization-free spread-spectrum communications.

It is a related object to eliminate the clock synchronization circuitry in the receiver to thereby simplify spread-spectrum communications.

It is a further object to achieve synchronization-free spread-spectrum communication while using a spreading code which does not require a radio frequency carrier wave.

It is yet another object to directly transmit an analog information stream via spread-spectrum communications without having to digitize the analog signal before transmission.

In accordance with these and other objects of the present invention, a preferred embodiment includes a transmitter for modulating an information stream with both a spreading signal and a carrier signal. These signals are modulated to create an information modulated spread-spectrum carrier signal which is transmitted to a receiver. The transmitter advantageously does not require any digitizing circuitry for transforming an analog signal into a digital format. The receiver comprises a first demodulator for non-coherently reducing the carrier wave component to a baseband or to a convenient intermediate frequency, and a second demodulator for removing the spreading signal from the information stream without synchronization of the spreading signals.

The apparatus above makes it possible to eliminate the synchronization process executed by receivers of prior art spread-spectrum communication systems. This is observed when comparing the apparatus and method of the present invention and the prior art. By modulating a spreading code with the information stream, the modulated spreading code itself becomes the information carrier. A chief advantage of the system then is that after the receiver removes the carrier wave component, the resulting signal is multiplied by the known spreading code to thereby recover the information stream. Thus, no synchronization is required because the invention modulates a spreading code with the information stream rather than modulating the carrier with the information, and then spreading the carrier.

One aspect of the invention is that a number of different demodulation possibilities become available. For example, the spread-spectrum coding is no longer directly tied to a specific transmission medium, such as radio frequency carrier waves. This allows the use of existing transmission systems, such as modems, to format and transmit the information stream via a desired transmission medium.

Another aspect of the invention is that the frequency of the carrier wave does not need to be a radio frequency, but instead any desired carrier frequency and any transmission medium or channel will suffice. For example, a telephone line can function as the channel, and thus the invention will function with no carrier frequency at all.

Another aspect is that an analog information stream can be directly modulated onto the spreading signal and the carrier signal. The demodulation process of the present invention will thus directly extract the analog signal, never having to digitize before or after transmission as in prior systems.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention.

Before describing the present invention, it is useful to set out some terms which will be used throughout this document. A spread-spectrum communication system will be described which transmits information. The information may be described as an information stream, information signal or data when it is an electrical signal before modulation in a transmitter, and after demodulation and recovery in a receiver. The information stream is modified by a spreading code or spreading sequence which is represented by an electrical or spreading signal. After the information stream is modulated with the spreading code, the result is a spread code or signal. The spread signal is then typically, but not necessarily, modulated with a carrier having a specific frequency, and is represented by a carrier signal or waveform. Finally, the carrier modulated spread code or the spread-signal is referred to as a spread-spectrum signal which is transmitted by a selected transmission medium or channel in whatever format is appropriate for the medium.

A chief advantage of the system and method to be described is that the information stream is carried on the spreading code itself. Thus, the output of a filter which is "matched" to the spreading code will carry the information stream as well, but in a format which is easily distinguished by non-complex and standard electronic circuitry.

Figure 1A:
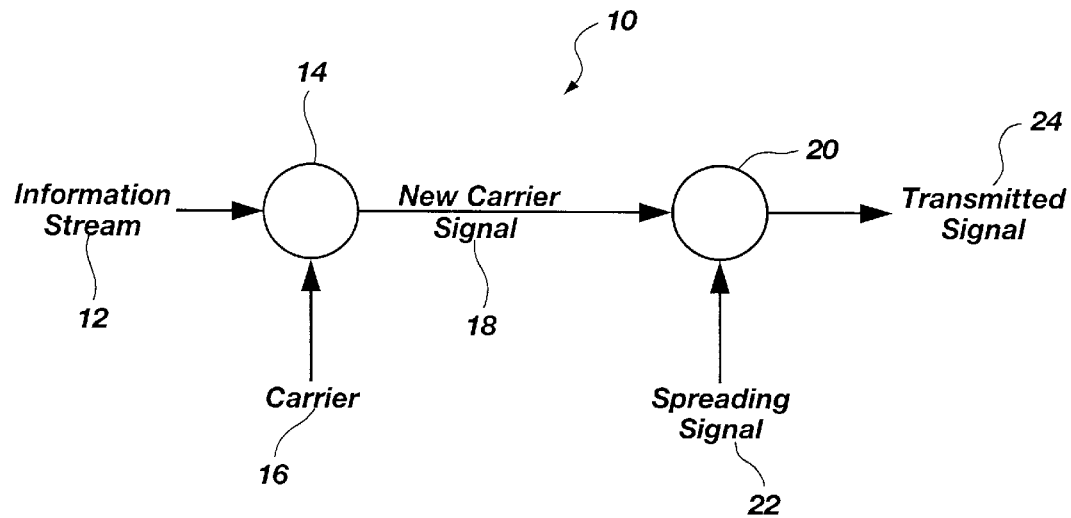
FIG. 1A is a block diagram of a traditional spread-spectrum transmitter circuit.
Figure 1B:
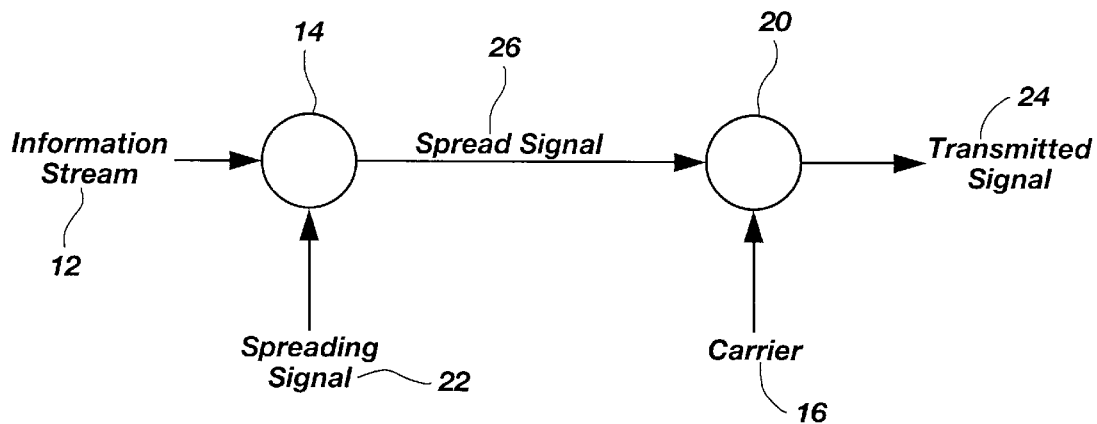
FIG. 1B is a block diagram of another traditional spread-spectrum transmitter circuit.
Figure 2A:
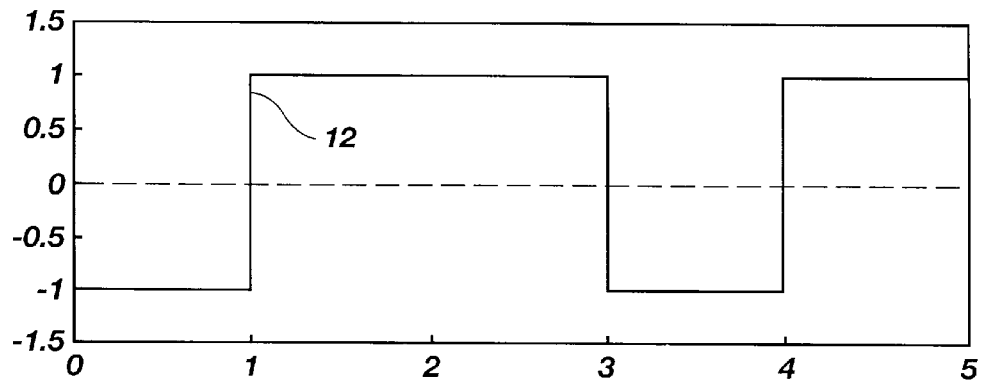
FIG. 2A is a waveform representative of a digital information or data stream to be transmitted by the circuit of FIG. 1B.
Figure 2B:
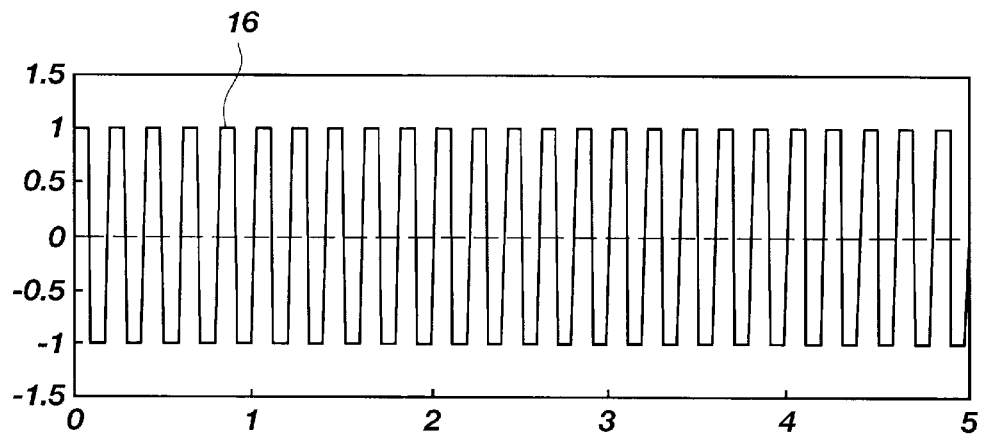
FIG. 2B is an example of a digital sequence spreading signal.
Figure 2C:
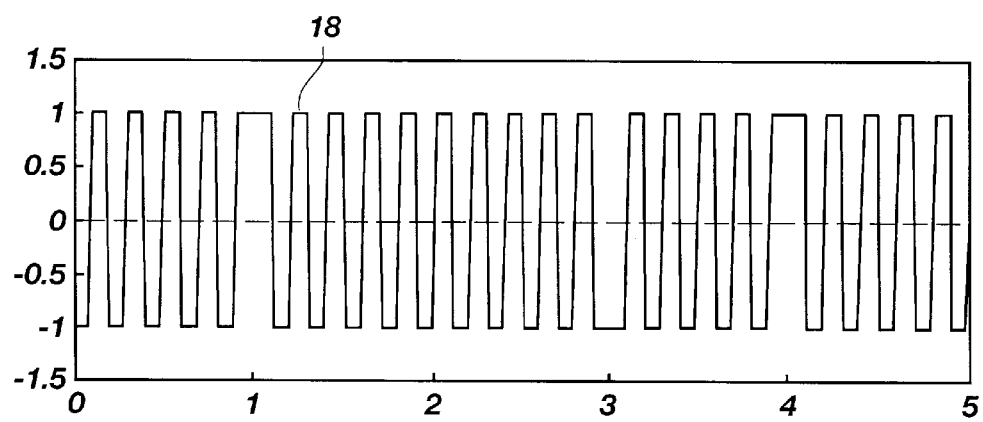
FIG. 2C is the spread signal resulting from the spreading signal being superimposed upon the information stream.
Figure 3:
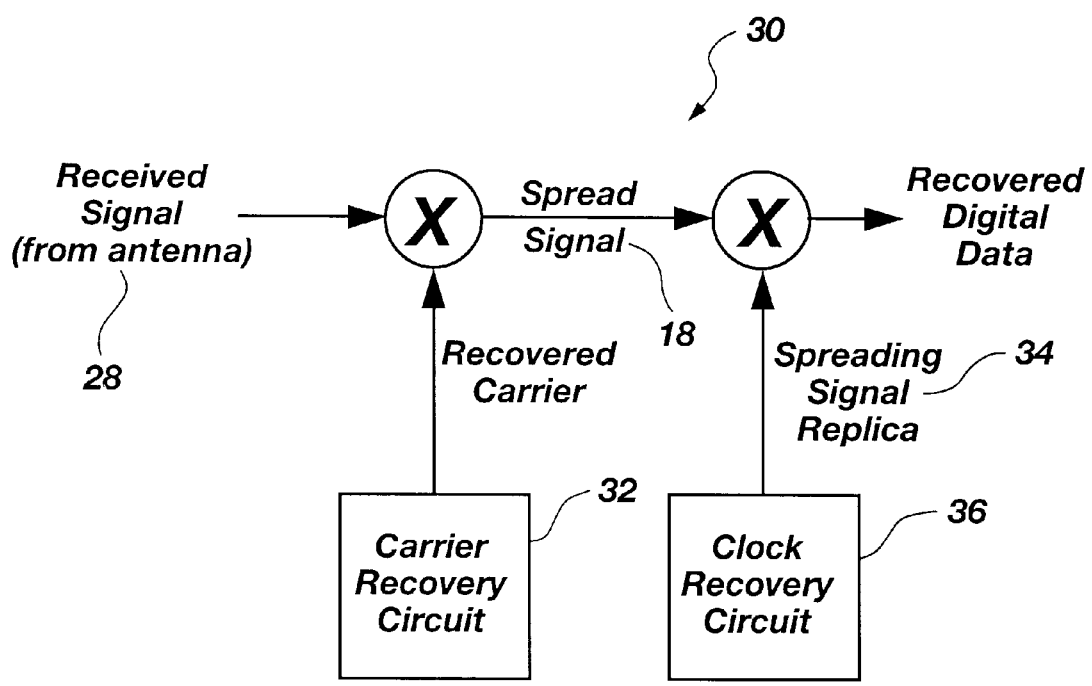
FIG. 3 is a block diagram of a traditional spread-spectrum receiver circuit.
Figure 4:
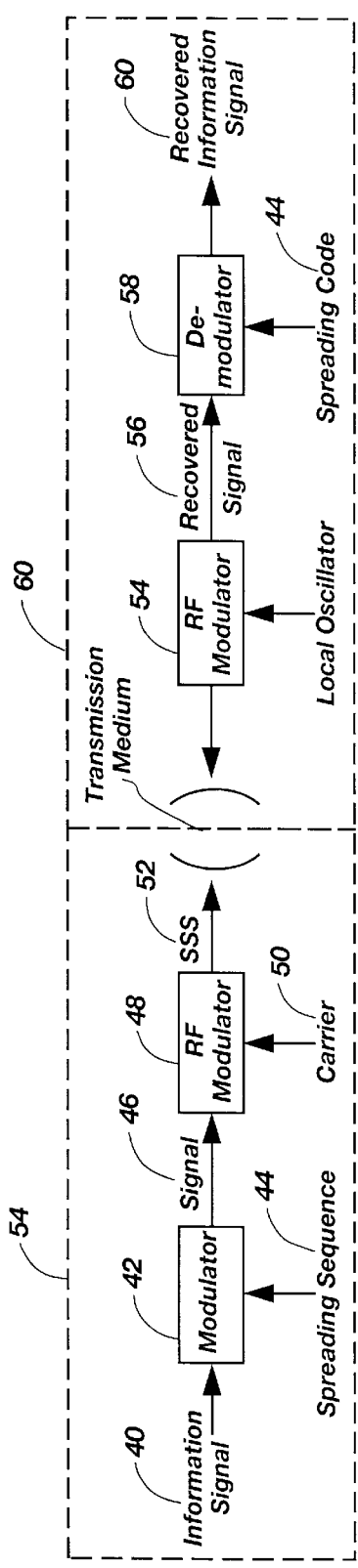
FIG. 4 is a block diagram of a transmitter and receiver constructed in accordance with the principles of the present invention.

The present invention advantageously simplifies both a transmitter and a receiver which communicate with spread-spectrum signals. A first aspect of the invention is the likely simplification of the transmitter 54. FIG. 4 shows an information signal 40 which is received by a modulator 42 and combined with a spreading signal 44. The resulting modulated signal 46 is then received by a second modulator 48 which combines it with a carrier signal 50 to produce a spread-spectrum signal 52 (SSS).

One point of novelty in this transmitter 54 lies in the format of the information signal 40 which can be provided to the modulator 42. In the prior art, spread-spectrum communications are exclusively digital. Therefore, if the information is provided in an analog format, it must first be digitized before modulation. The present invention, however, can transmit analog data. No digitizing is required. However, this does not exclude the transmission of digital data, because the invention advantageously transmits both. Therefore, the transmitter 54 does not require an analog to digital (A/D) converter or exclusively digitized data. The advantage is a simplification of the transmission process and a subsequent cost reduction because no A/D is necessary.

Another advantage of the transmitter 54 is that the second modulator 48 in the prior art is typically a radio frequency (RF) modulator because spread-spectrum signals are typically sent via radio transmission. However, the present invention advantageously does not require RF transmission. Any channel and associated frequency can be used as a carrier frequency for the present invention. Consequently, a telephone line or other cable medium can serve as the transmission medium. The frequency of the carrier signal can then be a range of frequencies appropriate to the selected transmission medium if, for example, there are frequency limitations of the selected medium. It should therefore be realized that if the channel does not require carrier frequencies such as in the aforementioned phone lines, the carrier is eliminated (a carrier frequency of zero).

FIG. 4 also shows the receiver 60 of the present invention. One significant advantage to be explained is the absence of any clock circuitry used by prior art systems to synchronize the incoming spread-spectrum signal with a stored spreading signal as explained previously. Clock synchronization is both a relatively costly and complex process. The present invention completely eliminates synchronization circuitry by modulating the spreading code with the information in the transmitter, rather than modulating the carrier. Consequently, the receiver 60 only has to remove the carrier in a first demodulator 54 using any direct method because it contains no information. Then, demodulating the recovered spread signal 56 using a second demodulator 58 will remove the spreading code 44 and leave the recovered information signal 60, because the spreading code is now the fundamental information carrier, instead of being an artifact to be removed.

Figure 5:
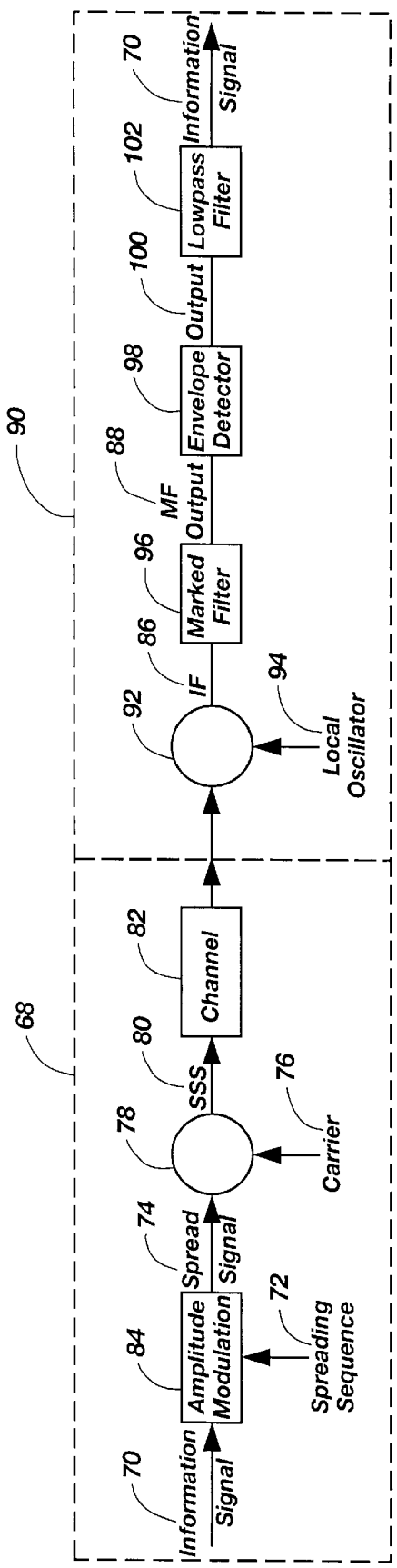
FIG. 5 is a block diagram of a preferred embodiment of the invention which implements the structure of FIG. 4.

FIG. 5 is a block diagram of a preferred embodiment of the invention which more specifically implements the basic structure of FIG. 4. The system shown is capable of carrying analog data such as a voice transmission, as well as digital data.

The transmitter 68 receives an information signal 70 and in a preferred embodiment, amplitude modulates it onto the spreading sequence 72 with amplitude modulating circuit 84. The most common spreading code is a standard m-sequence (or Barker code, Gold code, etc.). The resulting spread signal 74 is then combined with a carrier signal 76 appropriate for the selected transmission medium 82 in circuit 78. For example, the circuit 78 might use the double side-band suppressed carrier (DSBSC) method to modulate the carrier signal 76 with the modulated sequence 74. The spread-spectrum signal 80 (SSS) is then transmitted via the selected channel (transmission medium) 82.

The receiver 90 in the preferred embodiment consists of a receiving means 92 which matches the spread-spectrum signal 80 with an oscillator 94 in the receiver 90. This oscillator 94 is used to downconvert the spread-spectrum signal 80 to an intermediate frequency (IF) 86 using a matched filter 96 (a filter which is matched but not synchronized to the known spreading sequence 72). For example, a Surface Acoustic Wave (SAW) filter or digital Finite Impulse Response (FIR) filter can be used as a matched filter. The output 88 of the matched filter 96 is then sent to an envelope detector 98. If an analog signal was transmitted as the information signal 70, then the process is complete. For example, a low pass filter 102 can be used to retrieve the information signal 70. Note that if the information signal 70 is comprised of digital data, a symbol detector is then required at the output 100.

To illustrate the method described above, FIGS. 6A, 6B, 6C, 7A, 7B and 7C are provided to illustrate waveforms at various stages of processing in the transmitter 68 and receiver 90 of the present invention. Specifically, FIGS. 6A–C show an analog waveform at various stages in the transmitter 68, while FIGS. 7A–C show the waveform in the receiver 90.

Figure 6A:
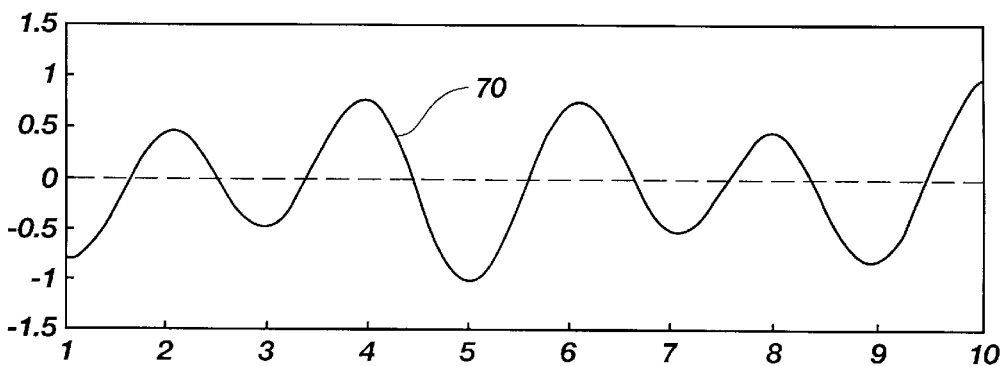
FIG. 6A is a waveform representative of an analog information or data stream to be transmitted by the present invention.
Figure 6B:
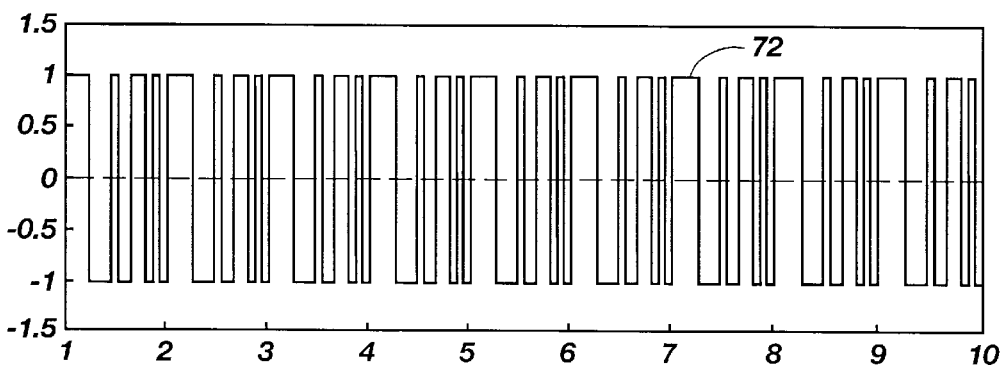
FIG. 6B is an example of a digital sequence spreading signal which is to be modulated by the analog signal of FIG. 6A.
Figure 6C:
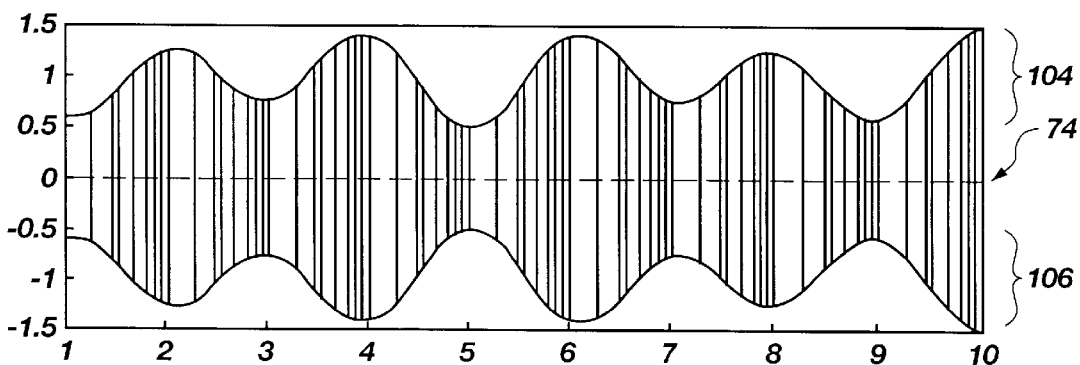
FIG. 6C is the spread signal which is the result of the spreading signal being superimposed upon the information stream.

FIG. 6A shows the information signal or stream 70 which is received at the input of the amplitude modulator 84 in FIG. 5. FIG. 6B shows a representative spreading sequence 72. The spreading sequence 72 is a predefined repetitious pattern usually in digital format, regardless of whether the information signal to be modulated is analog or digital. Although the waveform appears to go from +1 to −1, +1 should be considered a logic high, and −1 should be considered to be a logic low. It should be observed that the spreading sequence 72 would normally be repeated much more rapidly than shown here. However, the repetition rate was selected for the purpose of visual clarity. FIG. 6C shows the spread signal 74 which is the amplitude modulated combination of the analog waveform 70 of FIG. 6A and the spreading signal 72 of FIG. 6B. It should also be observed that because the signals 70,72 are amplitude modulated, the spread signal 74 has an upper sideband 104 and a lower sideband 106, where the lower sideband 104 is the inverted form of the upper sideband 106.

Although FIG. 5 shows that the preferred embodiment uses amplitude modulation, it should be noted that other types of modulation can be used, as long as the receiver 90 demodulates the spread-spectrum signal 80 using the appropriate method of demodulation. For example, frequency modulation can also be used in the transmitter 68, and consequently the receiver 90 will demodulate a frequency modulated spread-spectrum signal 80.

Figure 7A:
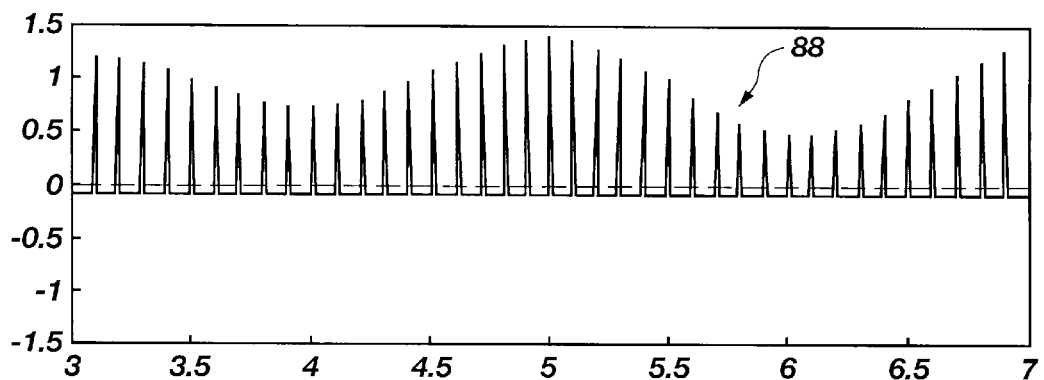
FIG. 7A is the receiver waveform of the matched filter output for the AM embodiment shown in FIG. 5 of the present invention.
Figure 7B:
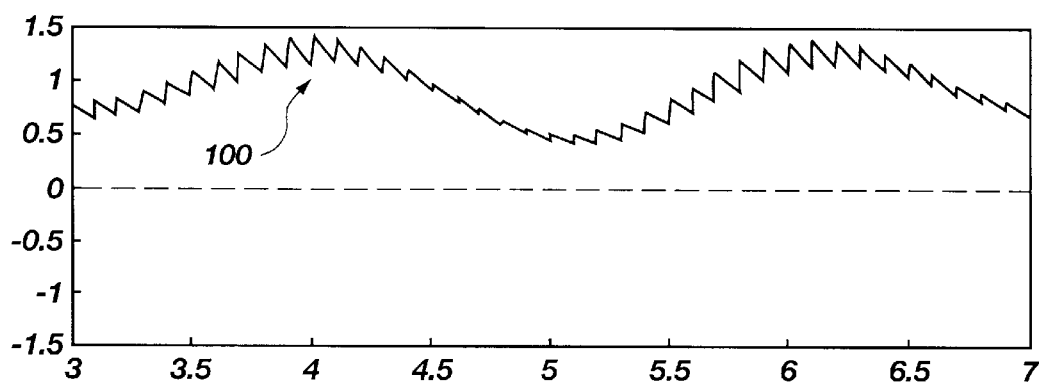
FIG. 7B is the waveform of FIG. 7A after using an envelope detector.
Figure 7C:
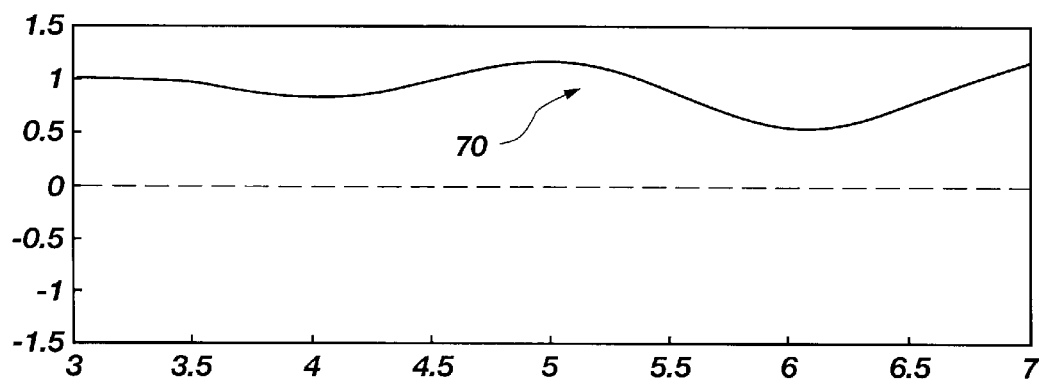
FIG. 7C is the recovered waveform from the output of the envelope detector of FIG. 7B.

FIGS. 7A–C show the critical waveforms in the receiver 90. The matched filter 96 is a SAW filter in this embodiment. The impulse response is a time-reversed copy of one period of the spreading sequence 72. The output 88 of the matched filter 96 is shown in FIG. 7A. FIG. 7B shows the output 100 of the envelope detector 98. Typically, for the preferred embodiment this circuit 98 is a simple diode detector which will track the peaks of the matched filter output 88. The information signal 70 is seen as riding on the peaks of the matched filter output 88, or on the peaks of the sawtooth output of the envelope detector 100. FIG. 7C shows the final output signal 70 which is the information signal, with the sawtooth waveform 100 filtered out. A DC blocking device is used to complete the demodulation process in the low-pass filter 102.

Although amplitude modulation has been used in the preferred embodiment, it is possible to use other modulation processes. For example, the rate at which the spreading waveform 72 is generated (the chip rate clock) may be varied in proportion to the information signal 70. This is analogous to the frequency modulation (FM) mentioned previously, with the exception that the spread sequence 74 is being modulated rather than a carrier 76.

In a related aspect, one advantage of using modulation is that radio frequency upconversion is no longer required to be tied directly to the information signal 70 modulation. Consequently, this allows use of, for example, FM upconversion and downconversion to place the spread signals 74 on the selected channel 82.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for synchronization-free spread-spectrum communication using a system including a transmitter and at least one receiver, wherein the method comprises the steps of:
   (1) modulating a spreading code signal with an information stream to generate an information carrying spread signal;
   (2) modulating a carrier signal with the spread signal to generate a spread-spectrum code signal;
   (3) transmitting the spread-spectrum code signal from the transmitter to the at least one receiver;
   (4) non-coherently reducing the spread-spectrum code signal to remove the carrier signal and thereby recover the spread signal without synchronizing the spreading code to the carrier signal; and
   (5) demodulating the spread signal to thereby recover the information stream without synchronizing the spreading code with the spread signal.

2. The method as defined in claim 1 wherein the step of modulating a spreading code with an information stream comprises the more specific step of amplitude modulating a spreading code with the information stream.

3. The method as defined in claim 2 wherein the step of amplitude modulating with a spreading code comprises the more specific step of selecting a standard m-sequence spreading code.

4. The method as defined in claim 1 wherein the step of modulating a carrier signal with the spread code to generate a spread-spectrum code comprises the more specific step of selecting a carrier frequency which is not limited to radio frequencies.

5. The method as defined in claim 4 wherein the step of modulating a carrier signal with the spread code to generate a spread-spectrum code comprises the more specific step of double side-band suppressed carrier modulating the carrier with the spread code.

6. The method as defined in claim 1 wherein the step of transmitting the spread-spectrum code to the at least one receiver comprises the more specific step of selecting a transmission medium from the group consisting of cable and air.

7. The method as defined in claim 1 wherein the step of non-coherently reducing the spread-spectrum code to recover the carrier signal comprises the more specific step of downconverting the spread-spectrum signal to an intermediate frequency.

8. A method for synchronization-free spread-spectrum communication using a system including a transmitter and at least one receiver, wherein the method comprises the steps of:
   (1) modulating a spreading code signal with an information stream to generate an information carrying spread signal;
   (2) modulating a carrier signal with the spread signal to generate a spread spectrum code signal;
   (3) transmitting the spread-spectrum code signal from the transmitter to the at least one receiver;
   (4) non-coherently reducing the spread-spectrum code signal to remove the carrier signal by downconverting the spread-spectrum code signal to an intermediate frequency to thereby recover the spread signal without synchronizing the spreading code to the carrier signal;
   (5) demodulating the spread signal using a filter which is only matched to the spreading code to thereby recover the information stream without synchronizing the spreading code with the spread signal.

9. The method as defined in claim 8 wherein the step of demodulating the spread signal without synchronization to recover the information stream comprises the additional step of using an envelope detector to recover the information stream in a saw tooth waveform format.

10. The method as defined in claim 9 wherein the step of recovering the information stream in a sawtooth waveform format is sufficient for audio communication.

11. The method as defined in claim 9 wherein the step of demodulating the spread-spectrum code to recover the information stream comprises the additional step of using a low-pass filter to thereby recover the information stream.

12. The method as defined in claim 11 wherein the step of using a low-pass filter to thereby recover the information stream is the sufficient for data communication.

13. A spread-spectrum communication system for transmitting and receiving information encoded in a spread-spectrum signal, the system including a transmitter and at least one receiver, and wherein the at least one receiver is comprised of:
   a receiving means for receiving the spread spectrum signal;
   a non-coherent reducing means for directly removing a carrier signal from the spread-spectrum signal to thereby recover a spread signal which has modulated thereon the information; and a demodulating means for removing a spreading signal from the spread signal without synchronizing the spreading code with the spread signal to thereby recover the information encoded thereon.

14. The system as defined in claim 13 wherein the information encoded in a spread-spectrum signal is originally represented by an analog or a digital signal.

15. The system as defined in claim 13 wherein the transmitter is comprised of:

a first modulating means for receiving the information signal and the carrier signal, and modulating the information signal with the carrier signal to thereby generate a first modulated signal;

a second modulating means for receiving the first modulated signal and the spreading signal, and modulating the first modulated signal with the spreading signal to thereby generate the spread-spectrum signal; and transmitting means for transmitting the spread-spectrum signal to the at least one receiver.

16. The system as defined in claim 13 wherein the transmitter is comprised of:

a first modulating means for receiving the information signal and the spreading signal, and modulating the information signal with the spreading signal to thereby generate a first modulated signal;

a second modulating means for receiving the first modulated signal and the carrier signal, and modulating the first modulated signal with the carrier signal to thereby generate the spread-spectrum signal; and transmitting means for transmitting the spread-spectrum signal to the at least one receiver.

17. The system as defined in claim 13 wherein the first modulating means is an amplitude modulator.

18. The system as defined in claim 13 wherein the transmitting means is a radio frequency transmission means.

19. The system as defined in claim 13 wherein the non-coherent reducing means is an RF demodulator.

20. The system as defined in claim 13 wherein the demodulating means for removing a spreading signal from the spread signal is comprised of a matched filter to thereby recover the information stream without synchronizing the spreading code with the spread signal, and having an input for receiving the spread signal and an output which is coupled to an input of an envelope detector.

21. The system as defined in claim 20 wherein an output of the envelope detector is coupled to an input of a low-pass or band-pass filter.

* * * * *